United States Patent
Fahlbusch et al.

(10) Patent No.: US 12,498,981 B2
(45) Date of Patent: Dec. 16, 2025

(54) CONTAINER ORCHESTRATION USING TIME-BASED LOAD DISTRIBUTION

(71) Applicant: SAP SE, Walldorf (DE)

(72) Inventors: Jannick Stephan Fahlbusch, Berlin (DE); Joachim Goennheimer, Walldorf (DE)

(73) Assignee: SAP SE, Walldorf (DE)

( * ) Notice: Subject to any disclaimer, the term of this patent is extended or adjusted under 35 U.S.C. 154(b) by 491 days.

(21) Appl. No.: 18/070,083

(22) Filed: Nov. 28, 2022

(65) Prior Publication Data
US 2024/0176668 A1    May 30, 2024

(51) Int. Cl.
*G06F 9/50*        (2006.01)

(52) U.S. Cl.
CPC .......... *G06F 9/5038* (2013.01); *G06F 9/5072* (2013.01); *G06F 9/5077* (2013.01); *G06F 2209/5014* (2013.01)

(58) Field of Classification Search
CPC .... G06F 9/5038; G06F 9/5072; G06F 9/5077; G06F 2209/5014; G06F 9/5005
See application file for complete search history.

(56) References Cited

U.S. PATENT DOCUMENTS

| | | | |
|---|---|---|---|
| 9,602,424 B1 | 3/2017 | Vincent et al. | |
| 2015/0277802 A1* | 10/2015 | Oikarinen | G06F 3/0689 711/114 |
| 2018/0011874 A1 | 1/2018 | Lacapra et al. | |
| 2019/0042321 A1 | 2/2019 | Venkatesh et al. | |
| 2019/0065275 A1* | 2/2019 | Wong | G06F 9/4843 |
| 2021/0103482 A1* | 4/2021 | Feldman | G06F 9/5011 |
| 2021/0240507 A1 | 8/2021 | Colombet et al. | |
| 2022/0103616 A1 | 3/2022 | Hassan et al. | |
| 2022/0385725 A1* | 12/2022 | Ferraro | G06F 9/5066 |
| 2023/0176846 A1* | 6/2023 | Agarwalla | H04L 43/16 717/168 |
| 2024/0388748 A1* | 11/2024 | Thakore | H04L 12/4625 |

FOREIGN PATENT DOCUMENTS

CN        112583583        3/2021

OTHER PUBLICATIONS

Al-Dhuraibi, Yahya, "Model-Driven Elasticity Management with OCCI", IEEE Transactions On Cloud Computing, vol. 9, No. 4, (Oct.-Dec. 2021), 1549-1562.

* cited by examiner

*Primary Examiner* — Sisley N Kim
(74) *Attorney, Agent, or Firm* — SCHWEGMAN LUNBERG & WOESSNER, P.A.

(57) ABSTRACT

In some embodiments, a computer system may, run a plurality of instances of an operator in parallel in a container orchestration system of a cloud environment, with each one of the plurality of instances of the operator watching the cloud environment for changes in a state of a resource. A first instance of the operator may detect a first change in the state of the resource, with the resource comprising one or more configuration requirements. In response to the detecting of the first change, the first instance of the operator may acquire a lease granting the first instance an exclusive right to the resource for a period of time, and then perform a reconciliation function within the period of time using the lease to change a state of a cloud component of the cloud environment to match the one or more configuration requirements of the resource.

20 Claims, 6 Drawing Sheets

300

| RESOURCE ID | INSTANCE ID | LEASE EXPIRATION |
|---|---|---|
| 141232 | INSTANCE-1 | UTC 2022-05-02T15:02:05+00:00 |
| 152342 | INSTANCE-1 | UTC 2022-05-02T09:17:02+00:00 |
| 212342 | INSTANCE-3 | UTC 2022-05-02T17:03:45+00:00 |
| 532342 | INSTANCE-2 | UTC 2022-05-02T19:20:25+00:00 |
| . . . | . . . | . . . |

CONTAINER ORCHESTRATION USING TIME-BASED LOAD DISTRIBUTION

BACKGROUND

Modern platform-as-a-service (PaaS) offerings are based on container orchestration frameworks that utilize an operator pattern to synchronize cloud components with state changes to corresponding resources. In an operator pattern, a control loop watches particular resources and reacts to state changes of these resources.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
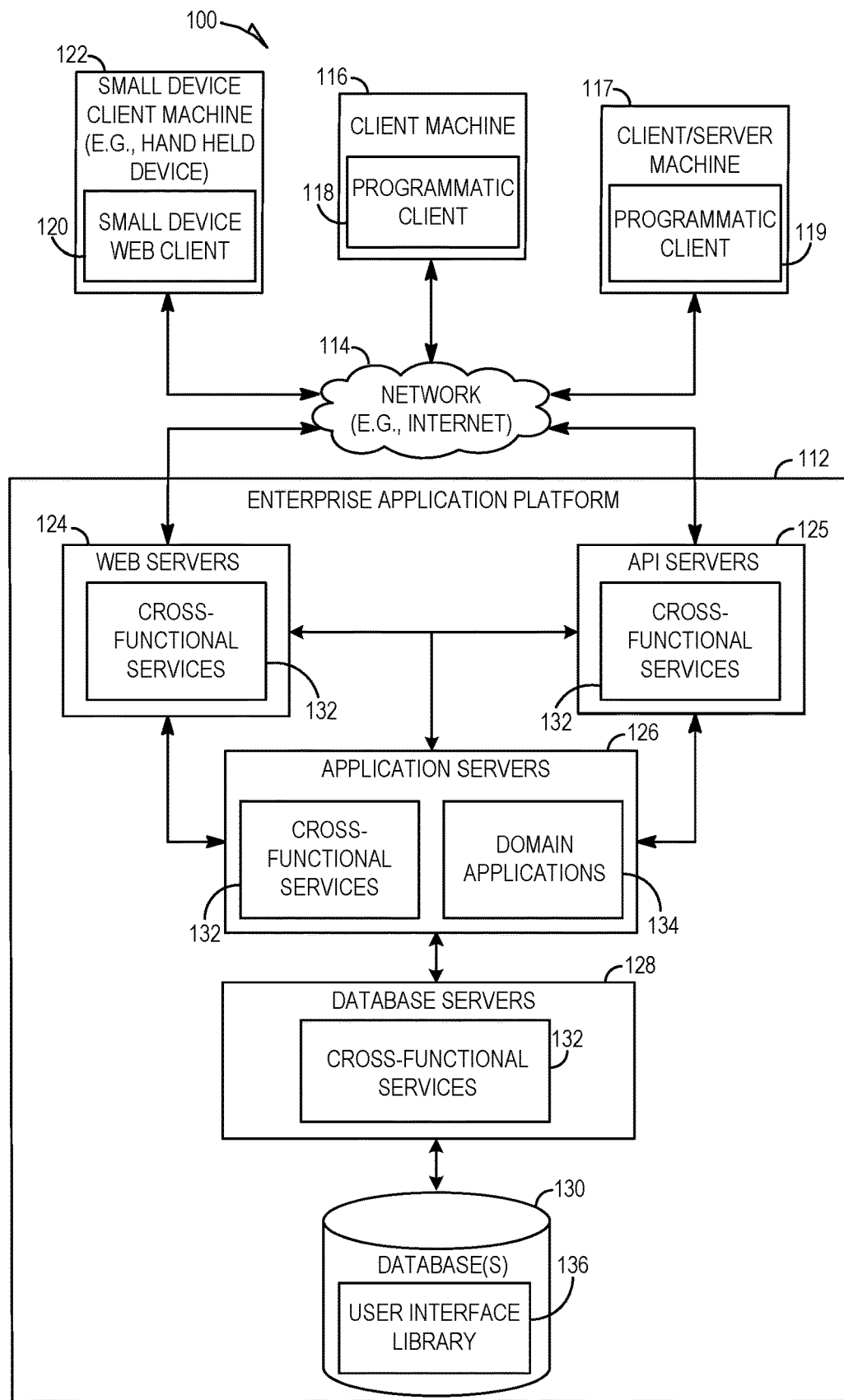
FIG. 1 is an example network diagram illustrating a system.

Example methods and systems of distributing load based on time-based permission are disclosed. In the following description, for purposes of explanation, numerous specific details are set forth in order to provide a thorough understanding of example embodiments. It will be evident, however, to one skilled in the art that the present embodiments can be practiced without these specific details.

The operators of container orchestration systems are often run as a singleton to avoid problematic concurrent accesses and write operations to system components, as concurrent access and write operations to system components may result in missing updates or misconfiguration of the desired system. The complexity of managing such operators grows with the overall growth of the underlying computing environment. For example, in large cloud environments, system resource consumption becomes a problem, as the operator may consume more system resources than available on the underlying system. Excessive consumption of system resources may lead to a number of technical problems, such as the operator exhibiting unexpected behavior, debugging becoming difficult, delay in the handling of operations, and inconsistencies in the states of components. As a result, the reliability of the cloud environment is reduced and the functioning of the online services and the computing resources of the cloud environment may suffer. In addition to the issues discussed above, other technical problems may arise as well.

The implementation of the features disclosed herein involves a non-generic, unconventional, and non-routine operation or combination of operations. By applying one or more of the solutions disclosed herein, some technical effects of the system and method of the present disclosure are to effectively and efficiently distribute a load amongst multiple instances of the same operator based on a time-based permission scheme. In some example embodiments, a computer system may shard an operator into a plurality of instances of the operator, and run the plurality of instances of the operator in parallel in a container orchestration system of a cloud environment, with each one of the plurality of instances of the operator watching the cloud environment for changes in a state of a resource. The resource may comprise one or more configuration requirements for a corresponding cloud component (e.g., an in-memory database) of the cloud environment. The different instances of the operator may be notified about new resources or changes in existing resources by events emitted from the underlying computing platform. Upon receiving such an event notification, the instances of the operator may contact a lease lock component that manages leases for the resource in an attempt to acquire a lease for the resource. The lease may grant an exclusive right to act on that particular resource for a period of time that ends at an expiration point in order prevent conflicting concurrent reconciliation operations and to ensure the data integrity of the corresponding cloud component.

A first instance of the operator that successfully acquires the lease may use the acquired lease to perform the appropriate reconciliation operation to change a state of the cloud component to match the configuration requirements of the resource, whereas the other instances of the operator may be denied the lease and, in response to being denied the lease, defer any subsequent attempt to acquire the lease and perform the reconciliation operation until the lease acquired by the first instance of the operator expires. The first instance of the operator and the other instances of the operator may store the result of their attempt to acquire the lease in a corresponding cache memory for the duration of the granted lease to prevent unnecessary communication with the lease lock component. In this way, each instance of the operator may first check its cache memory to determine if a lease has been granted for a resource before attempting to acquire the lease for the resource. By using multiple instances of the same operator to reconcile state changes using a lease that expires, the computer system effectively distributes the load of the underlying computer system, while avoiding the data integrity problems associated with conflicting concurrent reconciliation operations. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
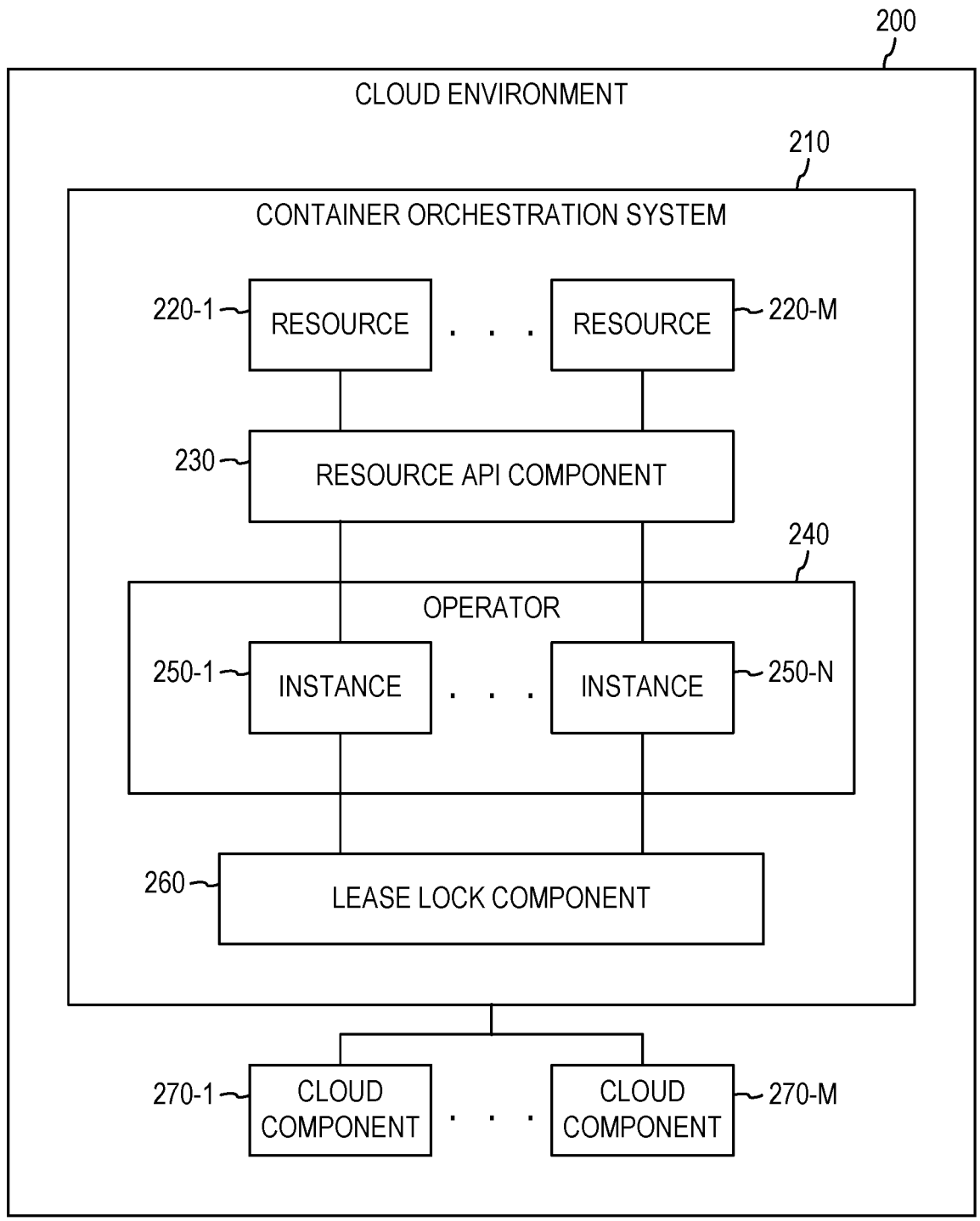
FIG. 2 is a block diagram illustrating an example container orchestration system.

FIG. 2 is a block diagram illustrating an example container orchestration system 210. The components shown in FIG. 2 may be configured to communicate with each other via one or more network connections. In some example embodiments, the container orchestration system 210 comprises any combination of one or more resources 220 (e.g., resources 220-1 to 220-M, where M is a positive integer greater than 1), a plurality of instances 250 (e.g., instances 250-1 to 250-N, where N is a positive integer greater than 1) of an operator 240, and a lease lock component 260. The container orchestration system 210 may be implemented within a cloud environment 200 along with one or more cloud components 270 (e.g., cloud components 270-1 to 270-M, where is a positive integer greater than 1).

One or more of the components of shown in FIG. 2 may be implemented by the enterprise application platform 112 of FIG. 1. For example, the container orchestration system 210 and the cloud components 270 may be incorporated into the application server(s) 126. However, the container orchestration system 210 and cloud components 270 may be implemented in other ways as well. In some example embodiments, the components shown in FIG. 2 may be connected to and communicate with each other via a network connection.

In some example embodiments, the enterprise application platform 112 of FIG. 1 may use the container orchestration system 210 to manage containerized services and applications. The enterprise application platform 112 may provide a customer-facing application that allows a user to request lifecycle actions on one or more cloud components 270. The cloud component 270 may comprise an in-memory database. An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access. Other types of cloud components 270 are also within the scope of the present disclosure.

In some example embodiments, the customer-facing application of the enterprise application platform 112 may enable a user to request database actions, such as database creation, deletion, modification, schema updates, and so forth. The container orchestration system 210 may interpret the requests and initiate the underlying database operation using one of the instances 250 of the operator 240. The container orchestration system 210 may use a resource 220 to specify how the corresponding cloud component 270 (e.g., the corresponding in-memory database) should be utilized. For example, the resource 220 may comprise a document that specifies one or more configuration requirements for the corresponding cloud component 270. Such configuration requirements may include, but are not limited to, a size, which features should be enabled, what security parameters should be utilized (e.g., password), and so forth. The container orchestration system 210 may then use one of the instances 250 of the operator 240 to bring the cloud component 270 into the state described in the resource 220. The instances 250 of the operator 240 may access the resources 220 and retrieve the configuration requirements via a resource API component 230.

In one example, if a user requests that an in-memory database be created according to certain specifications, then the specifications for creating the in-memory database may be stored as part of the resource 220, and one of the instances 250 of the operator 240 may perform a reconciliation function to create the in-memory database according to the specifications indicated by the resource 220. In another example, if a user requests that an existing in-memory database be deleted, then the specifications for deleting the in-memory database may be stored as part of the resource 220, and one of the instances 250 of the operator 240 may perform a reconciliation function to delete the in-memory database according to the specifications indicated by the resource 220. In yet another example, if a user requests that a modification of the in-memory database (e.g., adding data, deleting data, changing or updating data) be performed according to certain specifications, then the specifications for the modification of the in-memory database may be stored as part of the resource 220, and one of the instances 250 of the operator 240 may perform a reconciliation function to modify the in-memory database according to the specifications indicated by the resource 220.

When a change in a state of a resource 220 occurs, a corresponding event may be triggered notifying the plurality of instances 250 of the operator 240 that such a change has occurred. In order to avoid multiple instances 250 of the operator 240 from performing reconciliation functions on the same cloud component 270 concurrently, the container orchestration system 210 may use the lease lock component 260 to manage time-based leases for the resources 220. Each lease may grant to only one of the instances 250 of the operator 240 an exclusive right to the resource 220 for a limited period of time that ends at an expiration point in time. The lease lock component 260 may be configured to issue a lease for a resource 220 on a first come first serve basis, such that the first instance 250 of the plurality of instances 250 of the operator 240 that requests the lease is issued the lease by the lease lock component 260, and the other remaining instances 250 of the plurality of instances 250 of the operator that subsequently request the lease are denied the lease by the lease lock component 260. When issuing the lease to one of the instances 250 of the plurality of instances 250 of the operator 240, the lease lock component 260 may send to that instance 250 an access token or some other type of security credential that may be used to perform the reconciliation function on the cloud component 270 corresponding to the resource 220 for which the lease was acquired.

Figure 3:
FIG. 3 illustrates an example mapping of data stored in a key-value database of a lease lock component.

In some example embodiments, the lease lock component 260 may comprise a key-value database that stores data as a collection of key-value pairs in which a key serves as a unique identifier. FIG. 3 illustrates an example mapping 300 of data stored in a key-value database of the lease lock component 260. The lease lock component 260 may store details of each lease issued for a resource 220 by the lease lock component 260 in the key-value database using an identification of the resource 220 as the key. As seen in FIG. 3, these details may include the identification of the instance 250 of the operator 240 that acquired the lease and the point in time at which the lease expires, which are stored in association with the identification of the resource 220 for which the lease was acquired. Other details of the lease may be stored by the lease lock component 260 as well.

The details of any lease issued by the lease lock component 260 may be accessed using the identification of the corresponding resource 220 to look-up the details of the lease. For example, if the lease lock component 260 receives a request for a lease for a particular resource 220 from an instance 250 of the operator 240, the lease lock component 260 may search the key-value database for the identification of that particular resource 220. If the lease lock component 260 does not find the identification of that particular resource 220 in the key-value database, then the lease lock component 260 may determine that there is currently no lease that has been issued or pending for that particular resource 220, and then issue a lease to the instance 250 of the operator 240 that requested the lease. On the other hand, if the lease lock component 260 finds the identification of that particular resource 220 in the key-value database, then the lease lock component 260 may determine that a lease has been issued for that particular resource 220. The lease lock component 260 may further examine the details of the lease to determine if the lease is still pending or if it has expired based on a comparison of the current time with the point in time at which the lease expires.

When the lease lock component 260 determines that there is no currently pending lease for the resource, such as if there is no record of a lease for the resource 220 in the key-value database or a record of lease for the resource 220 in the key-value database indicates that the lease has expired, the lease lock component 260 may issue a lease to the instance 250 of the operator 240 that is requesting the lease, sending the lease to the instance 250 of the operator and storing a record of the issued lease and its details in the key-value database. The instance 250 of the operator 240 may store the issued lease and its details in a cache memory of the instance 250 of the operator 240 so that the instance 250 may simply access the issued lease from its cache memory for subsequent resource events rather than consuming network bandwidth in requesting the lease from the lease lock component 260.

When the lease lock component 260 determines that there is a currently pending lease for the resource, such as if there is a record of a lease for the resource 220 in the key-value database and the record of the lease indicates that the lease has not yet expired, the lease lock component 260 may send a denial of the request for the lease to the instance 250 of the operator 240 along with the details of the currently-pending lease. The instance 250 of the operator 240 may store the details of the currently pending lease in the cache memory of the instance 250 of the operator 240 so that the instance 250 may simply access the details of the current lease from its cache memory for subsequent resource events rather than consuming network bandwidth in requesting the lease from the lease lock component 260.

Figure 4:
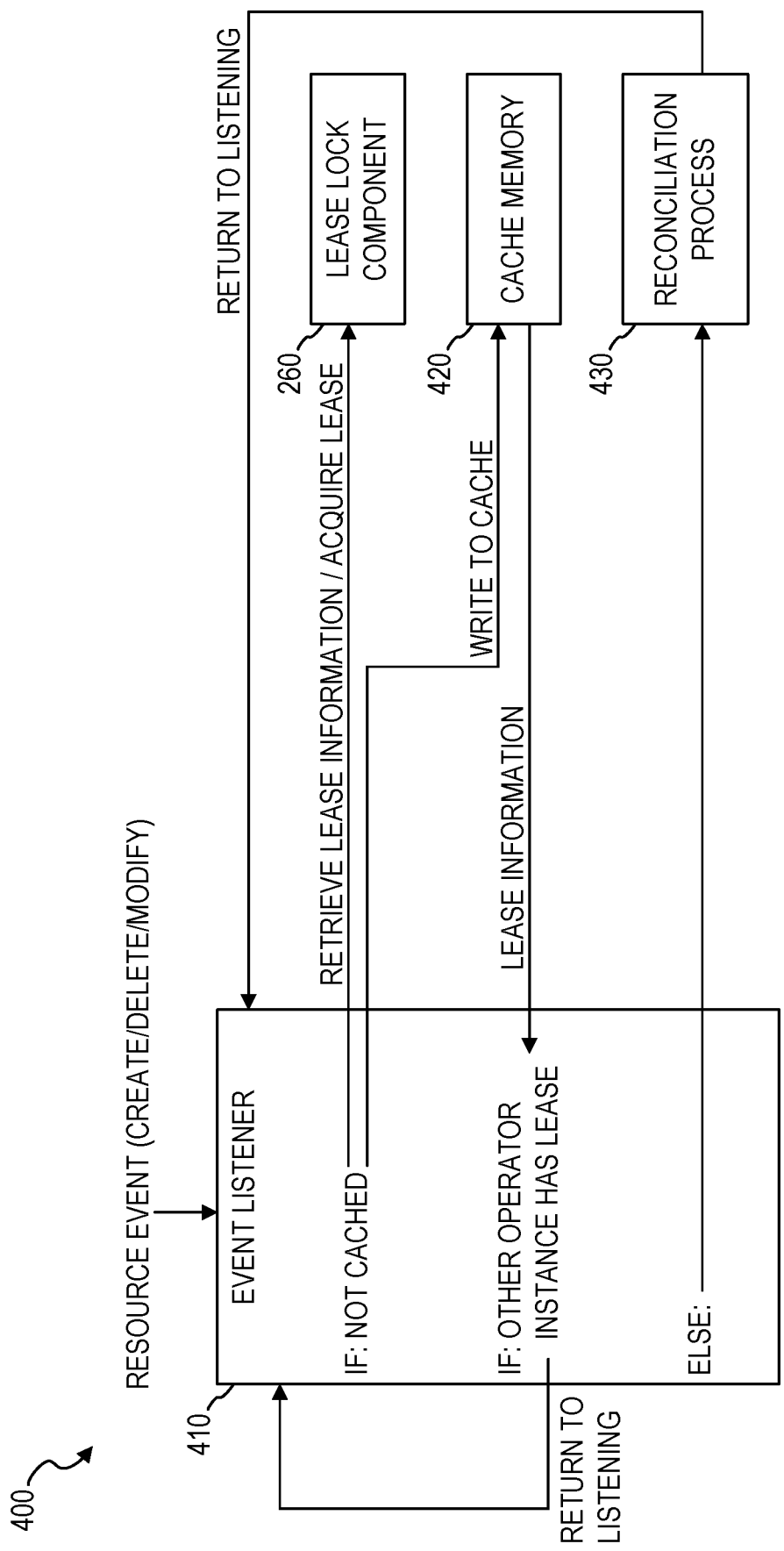
FIG. 4 illustrates an example control loop process flow.

In some example embodiments, each instance 250 of the operator 240 may implement a control loop that watches the cloud environment 200 for changes in the states of the resources 220, and then makes or requests changes to cloud components 270 via reconciliation functions such that the cloud components 270 match the configuration requirements of the resources 220. FIG. 4 illustrates an example control loop process flow. The control loop process flow 400 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the control loop process flow 400 are performed by the container orchestration system 210 of FIG. 2 or any combination of one or more of its components.

As part of the control loop process flow 400, each instance 250 of the operator 240 may comprise a corresponding event listener 410 that is configured to watch the cloud environment 200 for changes in the states of the resources 220, and then make or request changes to cloud components 270 via reconciliation functions such that the cloud components 270 match the configuration requirements of the resources 220. As seen in FIG. 4, when the event listener 410 receives an indication of a resource event, such as an indication a resource 220 has been created, deleted, or modified, then the event listener 410 may check its cache memory 420 for any lease information for the resource 220. If there is no lease information cached in the cache memory 420, then the event listener 410 may communicate with the lease lock component 260 to request a lease for the resource 220.

If there is no currently pending lease for the resource 220, then the event listener 410 may acquire the lease from the lease lock component 260 and write the corresponding lease information to its cache memory 420. If there is a pending lease for the resource 220, then the event listener 410 may retrieve the lease information from the lease lock component 260 and write the corresponding lease information to its cache memory 420. If the event listener 410 determines that another instance 250 of the operator 240 has the lease for the resource 220, then the event listener 410 may return to listening for resource events. Otherwise, the event listener 410 may proceed with performing a reconciliation process 430 to change a state of a cloud component 270 to match the configuration requirements of the resource 220. When the reconciliation process 430 is completed, then the event listener may return to listening for resource events. It is contemplated that any of the other features described within the present disclosure can be incorporated into the control loop process flow 400.

Figure 5:
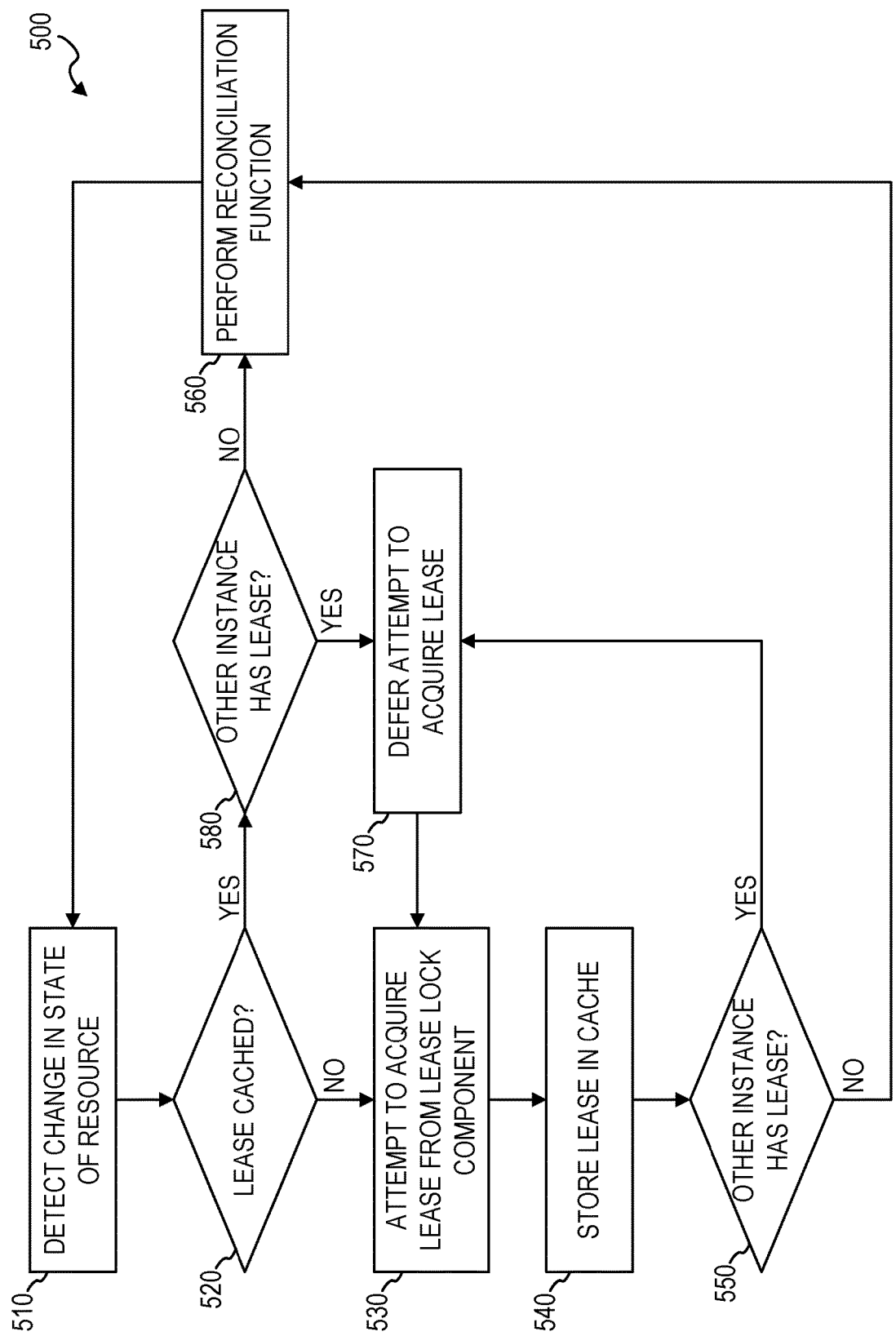
FIG. 5 is a flowchart illustrating an example method of distributing load based on time-based permission.

FIG. 5 is a flowchart illustrating an example method 500 of distributing load based on time-based permission. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by each instance 250 of the plurality of instances 250 of the operator 240, where the plurality of instances 250 of the operator 240 may be running in parallel in the container orchestration system 210.

At operation 510, the instance 250 may detect a change in a state of a resource 220. The resource 220 may comprise one or more configuration requirements. In some example embodiments, the change in the state of the resource 220 may comprises a creation of the resource 220, a deletion of the resource 220, or a modification of the resource 220. Other types of changes in the state of the resource 220 are also within the scope of the present disclosure.

The instance 250 may, at operation 520, determine whether or not a lease for the resource 220 is stored in a cache memory 420 of the instance 250. If it is determined that a lease for the resource 220 is not stored in the cache memory 420 of the instance 250, then the instance 250 may communicate with the lease lock component 260 and, at operation 530, attempt to acquire a lease for the resource 220, resulting in the instance 250 acquiring either a lease for the resource 220 (e.g., if no other instance 250 has acquired a lease for the resource 220) or information about a lease for the resource 220 (e.g., if another instance 250 has acquired a lease for the resource 220) from the lease lock component 260. The lease may grant an exclusive right to the resource 220 for a limited period of time that ends at an expiration point in time. In some example embodiments, the lease lock component 260 may comprise a key-value database that is configured to store lease information for the resources 220. When lease lock component 260 grants a lease for a resource 220 to an instance 250, the lease lock component 260 may be updated to include the corresponding lease information, which may include, but is not limited to, an identification of the resource 220, an identification of the instance 250 of the operator 240 that currently holds the lease, and an indication of the expiration point in time at which the lease expires.

After the instance 250 receives the lease or the lease information from the lease lock component 260, the instance 250 may store the lease or the lease information in the cache memory 420 of the instance 250 of the operator 240, at operation 540. Then, at operation 550, the instance 250 may determine whether another instance 250 of the operator 240 has the lease for the resource 220. If the instance 250 determines that no other instance 250 of the operator 240 has the lease for the resource 220, then the instance 250 may proceed to performing a reconciliation function within the limited period of time using the lease to change a state of a cloud component 270 of the cloud environment 200 to match the one or more configuration requirements of the resource 220, at operation 560. In some example embodiments, the cloud component 270 may comprise an in-memory database. However, other types of cloud components 270 are also within the scope of the present disclosure.

After performing the reconciliation function, the instance 250 of the operator 240 may return to watching the cloud environment 200 and detect another change in the state of the resource 220, at operation 510. Next, the instance 250 may, at operation 520, determine whether or not a lease for the resource 220 is stored in the cache memory 420 of the instance 250. If it is determined that a lease for the resource 220 is stored in the cache memory 420 of the instance 250, then the instance 250 may proceed to operation 580, where the instance 250 determines whether another instance 250 of the operator 240 has a lease for the resource 220 based on the details of the lease stored in the cache memory 420. If the instance 250 determines that no other instance 250 of the operator 240 has the lease for the resource 220, then the instance 250 itself has the lease and may proceed to performing a reconciliation function within the limited period of time using the lease to change a state of a cloud component 270 of the cloud environment 200 to match the one or more configuration requirements of the resource 220, at operation 560.

If, at either operation 550 or operation 580, it is determined by the instance 250 of the operator 240 that another instance 250 of the operator has a lease for the resource 220, then the instance 250 of the operator 240 may, at operation 570, store the lease information of the lease in its cache memory 420 and defer an attempt to acquire a lease for the resource 220 and an attempt to perform the reconciliation function to change the state of the cloud component 270 of the cloud environment 200 until after the expiration point in time indicated in the lease information has passed.

It is contemplated that any of the other features described within the present disclosure can be incorporated into the method 500.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: running a plurality of instances of an operator in parallel in a container orchestration system of a cloud environment, each one of the plurality of instances of the operator watching the cloud environment for changes in a state of a resource; detecting, by a first instance of a plurality of instances of an operator, a first change in the state of the resource, the resource comprising one or more configuration requirements; in response to the detecting of the first change in the state of the resource, acquiring, by the first instance of the operator, a first lease for the resource from a lease lock component, the first lease granting the first instance of the operator an exclusive right to the resource for a first limited period of time that ends at a first expiration point in time; and performing, by the first instance of the operator, a reconciliation function within the first limited period of time using the first lease to change a state of a cloud component of the cloud environment to match the one or more configuration requirements of the resource.

Example 2 includes the computer-implemented method of example 1, wherein the first change in the state of the resource comprises a creation of the resource, a deletion of the resource, or a modification of the resource.

Example 3 includes the computer-implemented method of example 1 or example 2, wherein the cloud component comprises an in-memory database.

Example 4 includes the computer-implemented method of any one of examples 1 to 3, wherein the lease lock component comprises a key-value database.

Example 5 includes the computer-implemented method of any one of examples 1 to 4, further comprising: storing, by the first instance of the operator, the first lease in a first cache memory of the first instance of the operator; detecting, by the first instance the operator, a second change in the state of the resource; and in response to the detecting of the second change in the state of the resource: determining, by the first instance of the operator, that the first lease stored in the first cache memory of the first instance of the operator has not expired based on the first expiration point in time; and based on the determining that the first lease has not expired, performing, by the first instance of the operator, the reconciliation function within the first limited period of time using the first lease stored in the first cache memory to change the state of the cloud component of the cloud environment based on the second change in the state of the resource.

Example 6 includes the computer-implemented method of any one of examples 1 to 5, further comprising: updating the lease lock component to include lease information of the first lease, the lease information comprising an identification of the resource, an identification of the first instance of the operator, and the first expiration point in time; detecting, by a second instance of the plurality of instances of the operator, the first change in the state of the resource; in response to the detecting of the first change in the state of the resource by the second instance of the operator, sending, by the second instance of the operator to the lease lock component, a first request for a second lease for the exclusive right to the resource during the first limited period of time; sending, by the lease lock component, a denial of the first request for the second lease to the second instance of the operator, the denial comprising the lease information of the first lease; and in response to receiving the denial of the first request: storing, by the second instance of the operator, the lease information of the first lease in a second cache memory of the second instance of the operator; and deferring, by the second instance of the operator, an attempt to acquire the second lease for the resource and an attempt to perform the reconciliation function to change the state of the cloud component of the cloud environment until after the first expiration point in time.

Example 7 includes the computer-implemented method of any one of examples 1 to 6, wherein the deferring comprises: determining, by the second instance of the operator, that the first lease has expired based on the lease information of the first lease stored in the second cache memory of the second instance of the operator; and in response to the determining that the first lease has expired: acquiring, by the second instance of the operator, the second lease for the resource from the lease lock component, the second lease granting the second instance of the operator the exclusive right to the resource for a second limited period of time; and performing, by the second instance of the operator, the reconciliation function within the second limited period of time using the second lease to change the state of the cloud component of the cloud environment to match the one or more configuration requirements of the resource.

Example 8 includes the computer-implemented method of any one of examples 1 to 7, further comprising: detecting, by the second instance the operator, a second change in the state of the resource; and in response to the detecting of the second change in the state of the resource: determining, by the second instance of the operator, that the first lease stored in the second cache memory of the second instance of the operator has not expired based on the first expiration point in time; and based on the determining that the first lease has not expired, deferring, by the second instance of the operator, an attempt to acquire the second lease for the resource and an attempt to perform the reconciliation function to change the state of the cloud component of the cloud environment until after the first expiration point in time.

Example 9 includes a system comprising: at least one processor; and a non-transitory computer-readable medium storing executable instructions that, when executed, cause the at least one processor to perform the method of any one of examples 1 to 8.

Example 10 includes a non-transitory machine-readable storage medium, tangibly embodying a set of instructions that, when executed by at least one processor, causes the at least one processor to perform the method of any one of examples 1 to 8.

Example 11 includes a machine-readable medium carrying a set of instructions that, when executed by at least one processor, causes the at least one processor to carry out the method of any one of examples 1 to 8.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 6:
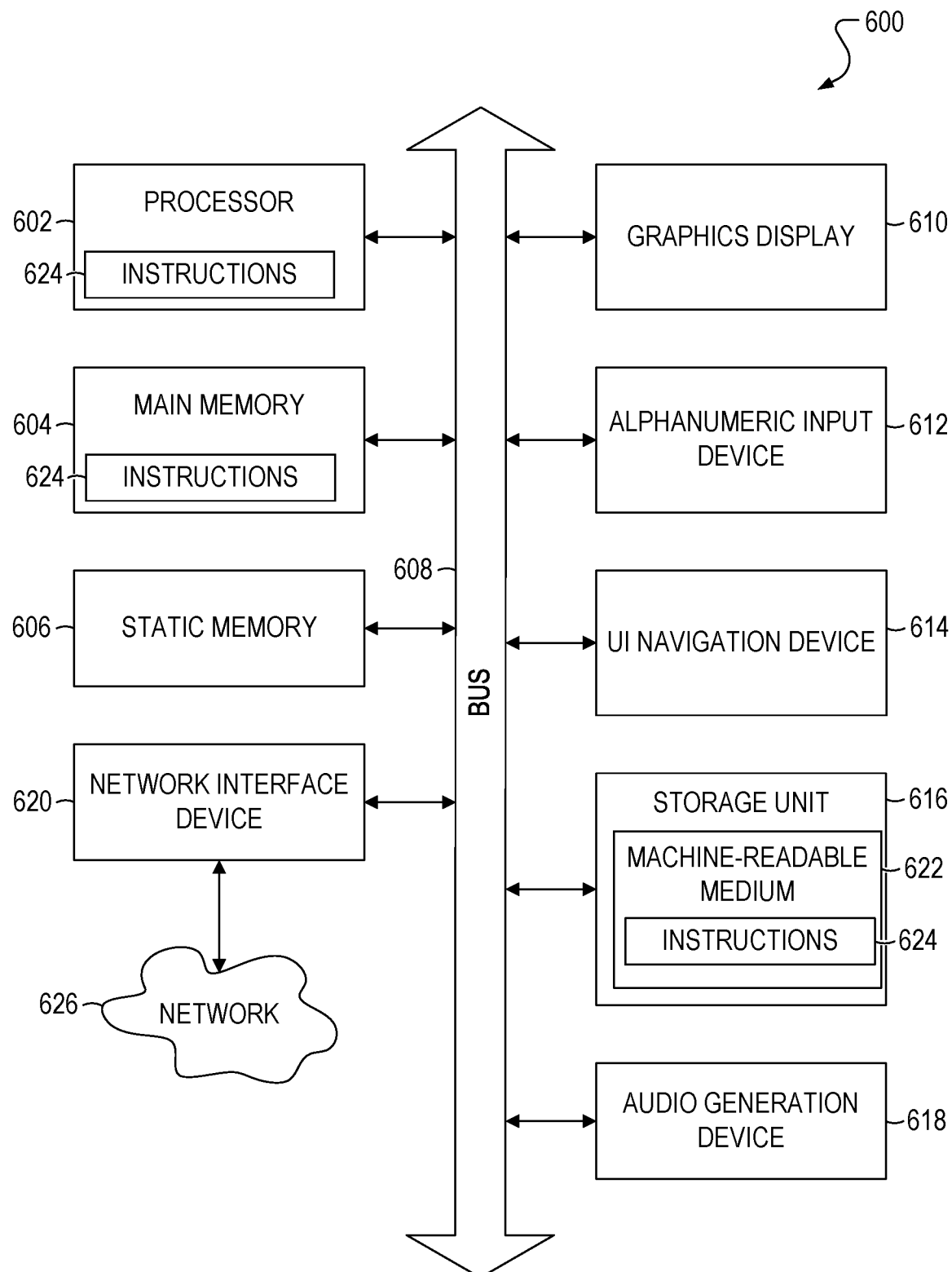
FIG. 6 is a block diagram of an example computer system on which methodologies described herein can be executed.

FIG. 6 is a block diagram of a machine in the example form of a computer system 600 within which instructions 624 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604, and a static memory 606, which communicate with each other via a bus 608. The computer system 600 may further include a graphics or video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a storage unit (e.g., a disk drive unit) 616, an audio or signal generation device 618 (e.g., a speaker), and a network interface device 620.

The storage unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system comprising a memory and at least one hardware processor, the computer-implemented method comprising:
   running a plurality of instances of an operator in parallel in a container orchestration system of a cloud environment, each one of the plurality of instances of the operator watching the cloud environment for changes in a state of a resource;
   detecting, by a first instance of the plurality of instances of the operator, a first change in the state of the resource, the resource comprising one or more configuration requirements;
   detecting, by a second instance of the plurality of instances of the operator, the first change in the state of the resource;
   in response to the detecting of the first change in the state of the resource by the first instance of the operator, acquiring, by the first instance of the operator, a first lease for the resource from a lease lock component, the first lease granting the first instance of the operator an exclusive right to the resource for a first limited period of time that ends at a first expiration point in time;
   in response to the detecting of the first change in the state of the resource by the second instance of the operator, sending, by the second instance of the operator to the lease lock component, a first request for a second lease for the exclusive right to the resource during the first limited period of time;
   updating the lease lock component to include lease information of the first lease, the lease information comprising an identification of the resource, an identification of the first instance of the operator, and an indication of the first expiration point in time;
   sending, by the lease lock component, a denial of the first request for the second lease to the second instance of the operator, the denial comprising the lease information of the first lease;
   performing, by the first instance of the operator, a reconciliation function within the first limited period of time using the first lease to change a state of a cloud component of the cloud environment to match the one or more configuration requirements of the resource; and
   in response to receiving the denial of the first request:
      storing, by the second instance of the operator, the lease information of the first lease in a second cache memory of the second instance of the operator; and
      deferring, by the second instance of the operator, an attempt to acquire the second lease for the resource and an attempt to perform the reconciliation function to change the state of the cloud component of the cloud environment until after the first expiration point in time.

2. The computer-implemented method of claim 1, wherein the first change in the state of the resource comprises a creation of the resource, a deletion of the resource, or a modification of the resource.

3. The computer-implemented method of claim 1, wherein the cloud component comprises an in-memory database.

4. The computer-implemented method of claim 1, wherein the lease lock component comprises a key-value database.

5. The computer-implemented method of claim 1, further comprising:
   storing, by the first instance of the operator, the first lease in a first cache memory of the first instance of the operator;
   detecting, by the first instance the operator, a second change in the state of the resource; and
   in response to the detecting of the second change in the state of the resource:
      determining, by the first instance of the operator, that the first lease stored in the first cache memory of the first instance of the operator has not expired based on the first expiration point in time; and
      based on the determining that the first lease has not expired, performing, by the first instance of the operator, the reconciliation function within the first limited period of time using the first lease stored in the first cache memory to change the state of the cloud component of the cloud environment based on the second change in the state of the resource.

6. The computer-implemented method of claim 1, wherein the deferring comprises:
   determining, by the second instance of the operator, that the first lease has expired based on the lease information of the first lease stored in the second cache memory of the second instance of the operator; and
   in response to the determining that the first lease has expired:
      acquiring, by the second instance of the operator, the second lease for the resource from the lease lock component, the second lease granting the second instance of the operator the exclusive right to the resource for a second limited period of time; and
      performing, by the second instance of the operator, the reconciliation function within the second limited period of time using the second lease to change the state of the cloud component of the cloud environment to match the one or more configuration requirements of the resource.

7. The computer-implemented method of claim 1, further comprising:
   detecting, by the second instance the operator, a second change in the state of the resource; and
   in response to the detecting of the second change in the state of the resource:
      determining, by the second instance of the operator, that the first lease stored in the second cache memory of the second instance of the operator has not expired based on the first expiration point in time; and
      based on the determining that the first lease has not expired, deferring, by the second instance of the operator, an attempt to acquire the second lease for the resource and an attempt to perform the reconciliation function to change the state of the cloud component of the cloud environment until after the first expiration point in time.

8. A system comprising:
   at least one hardware processor; and a non-transitory computer-readable medium storing executable instructions that, when executed, cause the at least one hardware processor to perform computer operations comprising:

running a plurality of instances of an operator in parallel in a container orchestration system of a cloud environment, each one of the plurality of instances of the operator watching the cloud environment for changes in a state of a resource;

detecting, by a first instance of the plurality of instances of the operator, a first change in the state of the resource, the resource comprising one or more configuration requirements;

detecting, by a second instance of the plurality of instances of the operator, the first change in the state of the resource;

in response to the detecting of the first change in the state of the resource by the first instance of the operator, acquiring, by the first instance of the operator, a first lease for the resource from a lease lock component, the first lease granting the first instance of the operator an exclusive right to the resource for a first limited period of time that ends at a first expiration point in time;

in response to the detecting of the first change in the state of the resource by the second instance of the operator, sending, by the second instance of the operator to the lease lock component, a first request for a second lease for the exclusive right to the resource during the first limited period of time;

updating the lease lock component to include lease information of the first lease, the lease information comprising an identification of the resource, an identification of the first instance of the operator, and an indication of the first expiration point in time;

sending, by the lease lock component, a denial of the first request for the second lease to the second instance of the operator, the denial comprising the lease information of the first lease;

performing, by the first instance of the operator, a reconciliation function within the first limited period of time using the first lease to change a state of a cloud component of the cloud environment to match the one or more configuration requirements of the resource; and in response to receiving the denial of the first request:
storing, by the second instance of the operator, the lease information of the first lease in a second cache memory of the second instance of the operator; and
deferring, by the second instance of the operator, an attempt to acquire the second lease for the resource and an attempt to perform the reconciliation function to change the state of the cloud component of the cloud environment until after the first expiration point in time.

9. The system of claim 8, wherein the first change in the state of the resource comprises a creation of the resource, a deletion of the resource, or a modification of the resource.

10. The system of claim 8, wherein the cloud component comprises an in-memory database.

11. The system of claim 8, wherein the lease lock component comprises a key-value database.

12. The system of claim 9, wherein the computer operations further comprise:

storing, by the first instance of the operator, the first lease in a first cache memory of the first instance of the operator;

detecting, by the first instance the operator, a second change in the state of the resource; and in response to the detecting of the second change in the state of the resource:
determining, by the first instance of the operator, that the first lease stored in the first cache memory of the first instance of the operator has not expired based on the first expiration point in time; and
based on the determining that the first lease has not expired, performing, by the first instance of the operator, the reconciliation function within the first limited period of time using the first lease stored in the first cache memory to change the state of the cloud component of the cloud environment based on the second change in the state of the resource.

13. The system of claim 8, wherein the deferring comprises:

determining, by the second instance of the operator, that the first lease has expired based on the lease information of the first lease stored in the second cache memory of the second instance of the operator; and in response to the determining that the first lease has expired:
acquiring, by the second instance of the operator, the second lease for the resource from the lease lock component, the second lease granting the second instance of the operator the exclusive right to the resource for a second limited period of time; and
performing, by the second instance of the operator, the reconciliation function within the second limited period of time using the second lease to change the state of the cloud component of the cloud environment to match the one or more configuration requirements of the resource.

14. The system of claim 8, wherein the computer operations further comprise:

detecting, by the second instance the operator, a second change in the state of the resource; and in response to the detecting of the second change in the state of the resource:
determining, by the second instance of the operator, that the first lease stored in the second cache memory of the second instance of the operator has not expired based on the first expiration point in time; and
based on the determining that the first lease has not expired, deferring, by the second instance of the operator, an attempt to acquire the second lease for the resource and an attempt to perform the reconciliation function to change the state of the cloud component of the cloud environment until after the first expiration point in time.

15. A non-transitory machine-readable storage medium tangibly embodying a set of instructions that, when executed by at least one hardware processor, causes the at least one hardware processor to perform computer operations comprising:

running a plurality of instances of an operator in parallel in a container orchestration system of a cloud environment, each one of the plurality of instances of the operator watching the cloud environment for changes in a state of a resource;

detecting, by a first instance of the plurality of instances of the operator, a first change in the state of the resource, the resource comprising one or more configuration requirements;

detecting, by a second instance of the plurality of instances of the operator, the first change in the state of the resource;

in response to the detecting of the first change in the state of the resource by the first instance of the operator, acquiring, by the first instance of the operator, a first lease for the resource from a lease lock component, the first lease granting the first instance of the operator an exclusive right to the resource for a first limited period of time that ends at a first expiration point in time;

in response to the detecting of the first change in the state of the resource by the second instance of the operator, sending, by the second instance of the operator to the lease lock component, a first request for a second lease for the exclusive right to the resource during the first limited period of time;

updating the lease lock component to include lease information of the first lease, the lease information comprising an identification of the resource, an identification of the first instance of the operator, and an indication of the first expiration point in time;

sending, by the lease lock component, a denial of the first request for the second lease to the second instance of the operator, the denial comprising the lease information of the first lease;

performing, by the first instance of the operator, a reconciliation function within the first limited period of time using the first lease to change a state of a cloud component of the cloud environment to match the one or more configuration requirements of the resource; and in response to receiving the denial of the first request:
    storing, by the second instance of the operator, the lease information of the first lease in a second cache memory of the second instance of the operator; and
    deferring, by the second instance of the operator, an attempt to acquire the second lease for the resource and an attempt to perform the reconciliation function to change the state of the cloud component of the cloud environment until after the first expiration point in time.

16. The non-transitory machine-readable storage medium of claim 15, wherein the first change in the state of the resource comprises a creation of the resource, a deletion of the resource, or a modification of the resource.

17. The non-transitory machine-readable storage medium of claim 15, wherein the cloud component comprises an in-memory database.

18. The non-transitory machine-readable storage medium of claim 15, wherein the lease lock component comprises a key-value database.

19. The non-transitory machine-readable storage medium of claim 15, wherein the computer operations further comprise:
    storing, by the first instance of the operator, the first lease in a first cache memory of the first instance of the operator;
    detecting, by the first instance the operator, a second change in the state of the resource; and
    in response to the detecting of the second change in the state of the resource:
        determining, by the first instance of the operator, that the first lease stored in the first cache memory of the first instance of the operator has not expired based on the first expiration point in time; and
        based on the determining that the first lease has not expired, performing, by the first instance of the operator, the reconciliation function within the first limited period of time using the first lease stored in the first cache memory to change the state of the cloud component of the cloud environment based on the second change in the state of the resource.

20. The non-transitory machine-readable storage medium of claim 15, wherein the deferring comprises:
    determining, by the second instance of the operator, that the first lease has expired based on the lease information of the first lease stored in the second cache memory of the second instance of the operator; and
    in response to the determining that the first lease has expired:
        acquiring, by the second instance of the operator, the second lease for the resource from the lease lock component, the second lease granting the second instance of the operator the exclusive right to the resource for a second limited period of time; and
        performing, by the second instance of the operator, the reconciliation function within the second limited period of time using the second lease to change the state of the cloud component of the cloud environment to match the one or more configuration requirements of the resource.

* * * * *